(12) United States Patent
Schrader et al.

(10) Patent No.: US 11,764,500 B2
(45) Date of Patent: Sep. 19, 2023

(54) ASSEMBLY FOR ELECTRICAL EQUIPMENT AND METHOD FOR PRODUCING SUCH AN ASSEMBLY

(71) Applicant: Phoenix Contact GmbH & Co. KG, Blomberg (DE)

(72) Inventors: Andreas Schrader, Delbrueck (DE); Ingo Werner, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 17/279,605

(22) PCT Filed: Sep. 25, 2019

(86) PCT No.: PCT/EP2019/075804
§ 371 (c)(1),
(2) Date: Mar. 25, 2021

(87) PCT Pub. No.: WO2020/069932
PCT Pub. Date: Apr. 9, 2020

(65) Prior Publication Data
US 2022/0029318 A1    Jan. 27, 2022

(30) Foreign Application Priority Data
Oct. 2, 2018 (DE) ............. 10 2018 124 322.7

(51) Int. Cl.
*H01R 9/26* (2006.01)
*B23K 26/21* (2014.01)
(Continued)

(52) U.S. Cl.
CPC ............ *H01R 9/26* (2013.01); *B23K 26/21* (2015.10); *H01R 9/2466* (2013.01); *H01R 13/514* (2013.01)

(58) Field of Classification Search
CPC .. H01R 13/514; H01R 9/2408; H01R 9/2466; H01R 9/26
See application file for complete search history.

(56) References Cited

U.S. PATENT DOCUMENTS 4,032,209 A * 6/1977 Rutkowski ............... H01R 9/26
                                                          439/211
5,839,922 A   11/1998 Orlando et al.
(Continued)

FOREIGN PATENT DOCUMENTS

CN    200959416 Y    10/2007
CN    207088493 U    3/2018
(Continued)

*Primary Examiner* — Jean F Duverne
(74) *Attorney, Agent, or Firm* — LEYDIG, VOIT & MAYER, LTD.

(57) ABSTRACT

An assembly for electrical equipment includes: a plurality of connection devices to be modularly arranged side-by-side in a row along a row direction, each having a housing and at least one termination point for connecting at least one electrical conductor; and a connecting element having a main body and a connecting portion formed on the main body, the connecting element connecting together two of the plurality of connection devices which two connection devices are adjacent to each other along the row direction. The connecting element is connectable via the connecting portion to the housing of at least one of the two adjacent connection devices by material-to-material bonding.

13 Claims, 4 Drawing Sheets

(51) Int. Cl.
*H01R 9/24* (2006.01)
*H01R 13/514* (2006.01)

(56) References Cited

U.S. PATENT DOCUMENTS

| | | |
|---|---|---|
| 8,480,441 B2 | 7/2013 | Tasi et al. |
| 10,756,476 B2 | 8/2020 | Koelle |
| 2003/0153212 A1* | 8/2003 | Falchetti ............ H01H 85/2045 439/620.27 |
| 2004/0077194 A1* | 4/2004 | Otto ...................... B60K 15/00 439/100 |
| 2008/0070454 A1 | 3/2008 | Chang |
| 2009/0305540 A1 | 12/2009 | Mossinger et al. |
| 2011/0092101 A1 | 4/2011 | Helmig et al. |
| 2018/0205171 A1 | 7/2018 | Dean |

FOREIGN PATENT DOCUMENTS

| | | |
|---|---|---|
| CN | 107925188 A | 4/2018 |
| DE | 4128329 A1 | 3/1993 |
| DE | 29522289 U1 | 6/2001 |
| DE | 102006038330 A1 | 2/2008 |
| DE | 102008027399 A1 | 12/2009 |
| DE | 102009013689 A1 | 9/2010 |
| DE | 202010015731 U1 | 1/2011 |
| DE | 202013104467 U1 | 10/2013 |
| DE | 102016105725 A1 | 10/2017 |
| DE | 102017121650 A1 | 3/2019 |
| EP | 1434308 B1 | 2/2006 |
| FR | 2742004 A1 | 6/1997 |
| TW | M550920 U | 10/2017 |

\* cited by examiner

ASSEMBLY FOR ELECTRICAL EQUIPMENT AND METHOD FOR PRODUCING SUCH AN ASSEMBLY

CROSS-REFERENCE TO PRIOR APPLICATIONS

This application is a U.S. National Phase application under 35 U.S.C. § 371 of International Application No. PCT/EP2019/075804, filed on Sep. 25, 2019, and claims benefit to German Patent Application No. DE 10 2018 124 322.7, filed on Oct. 2, 2018. The International Application was published in German on Apr. 9, 2020 as WO 2020/069932 under PCT Article 21(2).

FIELD

The present invention relates to an assembly for electrical equipment, and to a method for producing an assembly for electrical equipment.

BACKGROUND

Such an assembly includes a plurality of connection devices capable of being modularly arranged side-by-side in a row along a row direction, each having a housing and at least one termination point for connecting at least one electrical conductor.

Such a connection device may take the form of, for example, a connecting terminal, such as a terminal block. However, such a connection device may also be in the form of, for example, a connector for plugging connection to an associated mating connector, or in the form of a so-called base strip to which a plurality of modular connectors can be connected.

By combining a plurality of connection devices, it is an object to produce, for example, an assembly to be mounted on a circuit board to thereby provide electrical contacts on the circuit board. In this connection, it is desirable to be able to combine, where necessary, different connection devices, which may differ, for example, in the contour of their housings, in order to allow an assembly to be variably configured to provide different connection functionalities on a circuit board, for example.

In conventional assemblies of this type, provision has been made to interlockingly connect adjacent connection devices together, for example, by snap-fit connections or so-called dovetail tongue/groove combinations. Such interlocking connections require dedicated matching of the connection devices to be arranged side-by-side.

DE 295 22 289 U1 describes a terminal block assembly for electricity meters where terminal arrangements are connected together by intermediate plates. The intermediate plates serve to provide electrical insulation between adjacent terminal arrangements and, to this end, are made of an impact-resistant plastic material.

In a terminal block system known from EP 1 434 308 B1, a terminal block of one type is disposed between terminal blocks of another type and spaced therefrom by spacer plates. The spacer plates are configured to have a width such that a cross-connecting element having pointed contact pins can be attached to termination points of all block terminals.

From DE 20 2013 104 467 U1 there is known a terminal block arrangement where separator plates are disposed between adjacent terminal blocks for electrical insulation.

DE 20 2010 015 731 U1 describes a terminal block arrangement where a supporting plate is disposed between two adjacent terminal blocks. The supporting plate has supporting arms for supporting the arrangement relative to a circuit board.

SUMMARY

In an embodiment, the present invention provides an assembly for electrical equipment, comprising: a plurality of connection devices configured to be modularly arranged side-by-side in a row along a row direction, each having a housing and at least one termination point configured to connect at least one electrical conductor; and a connecting element having a main body and a connecting portion formed on the main body, the connecting element being configured to connect together two of the plurality of connection devices which two connection devices are adjacent to each other along the row direction, wherein the connecting element is connectable via the connecting portion to the housing of at least one of the two adjacent connection devices by material-to-material bonding.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an assembly for electrical equipment and a method for producing an assembly for electrical equipment that allow adjacent connection devices to be joined in a variable manner.

Accordingly, the assembly has a connecting element including a main body and a connecting portion formed on the main body. The connecting element is configured to connect together two of the plurality of connection devices, which two connection devices are adjacent to each other along the row direction. The connecting element is to be connected via the connecting portion to the housing of at least one of the two adjacent connection devices by material-to-material bonding.

Thus, two adjacent connection devices are connected together by a connecting element disposed therebetween. More specifically, the connecting element is to be connected by material-to-material bonding to at least one of the adjacent connection devices that are to be connected together, so that in the connected state, a material-to-material bond exists between the connecting element and the associated connection device.

The material-to-material bond may be produced, for example, by adhesively bonding or welding the connecting element to the associated connection device. In the case of adhesive bonding, the connecting portion of the connecting element is wetted with a suitable adhesive and placed against the associated connection device so that the connecting element and the connection device are adhesively bonded together. A welded joint may be produced, for example, by laser welding, in particular laser transmission welding, by ultrasonic welding, or another welding process, in particular for welding of plastic parts.

The connecting element allows the housings of adjacent connection devices to be connected together in a variable manner, it being possible for the housings to have the same or different housing contours. Because the connecting element is connected by a material-to-material bond to at least one, preferably both of the adjacent connection devices, the housings of the connection devices can differ in design and size. The connection is, in each case, produced by the connecting element, which is connected by a material-to-material bond to one or both of the adjacent connection devices, which allows a user to configure the assembly in a variable manner by combining different connection devices.

To produce the assembly, the connection devices are arranged side-by-side in a row along the row direction, a connecting element being disposed between each two of the connection devices arranged adjacent to each other along the row direction. The connecting element is connected to one, preferably both of the adjacent connection devices by a material-to-material bond, in particular by adhesive bonding or welding, so that the connection devices are fixedly attached to one another via the connecting element interposed therebetween.

The connecting element has a main body and a connecting portion formed on the main body. The main body preferably extends along a plane oriented perpendicular to the row direction and forms a planar portion that extends planarly between the adjacent connection devices when the connection devices are connected together. Thus, if the connecting element is made from an electrically insulating plastic material, the base member may also serve to provide electrical insulation between adjacent connection devices.

In an embodiment, the connecting portion, which serves to produce the material-to-material bond to at least one of the connection devices, extends circumferentially around at least a portion of the main body. In an embodiment, the main body is bounded by the connecting portion in the plane perpendicular to the row direction by the connecting portion extending along the edge of the main body. More specifically, the connecting portion may extend, for example, about the entire circumference of the main body, and thus fully surround the main body (as viewed circumferentially about the row direction). Alternatively, the connecting portion may extend along two or three sides of the main body, and thus bound the main body around only a portion thereof.

In an embodiment, in a position where the connecting element has been placed against the at least one of the two adjacent connection devices, the connecting portion extends around at least a portion of the housing of the connection device. Thus, the connecting element is placed against the housing of the associated connection device in such a way that the connecting portion extends externally on the housing and around the housing. The connection of the connecting element to the associated connection device is produced via the connecting portion so that, due to its circumferential extension around the housing, a firm and strong connection is created between the connecting element and the associated connection device.

In an embodiment, the connecting portion projects from the main body along the row direction, at least on one side. The connecting portion may be configured, for example, as a web portion which projects from the main body along the row direction and with which the connecting element can be placed against the housing of the associated connection device to connect the connecting element to the connection device by material-to-material bonding.

To this end, the web portion may have to be placed against the housing of the associated connection device such that, in a position where the connecting element has been placed against the connection device, the web portion overlaps the housing of the connection device in such a way that the web portion faces a bonding surface located on the housing, as viewed transversely to the row direction. Thus, via the web portion, a connection can be created between the connecting element and the housing of the connection device, in particular by adhesive bonding or welding. This is accomplished by the web portion forming a material-to-material bond with the bonding surface of the housing, either by adhesive bonding or by welding.

Because the web portion faces the bonding surface, as viewed transversely to the row direction, contact is made between the web portion and the bonding surface along a direction transverse to the row direction. This makes it possible, in particular when creating a material-to-material bond by laser beam welding, to direct a laser beam from outside in a direction transverse to the row direction toward the arrangement including the connection device and the connecting element so that the material of the web portion and/or of the bonding surface is melted, thereby creating a material-to-material bond between the web element and the housing of the connection device.

If the connecting element is connected to the associated connection device by laser transmission welding, the web portion may be made, for example, from a (plastic) material that is transparent to a laser welding beam, while the housing, at its bonding surface, is made from a material that absorbs energy of the laser welding beam, and thus can be melted by the laser welding beam. An example of a material that is transparent to the laser welding beam is a thermoplastic material. In contrast, a material that absorbs the laser welding beam can be obtained, for example, by mixing particles, for example soot particulates, into a thermoplastic material. During laser transmission welding, the laser welding beam is directed from outside onto the web portion, which is transparent to the laser welding beam. The laser welding beam passes through the web portion and hits the bonding surface, at which the laser welding beam is at least partially absorbed and which is thus melted by the energy of the laser welding beam so that a material-to-material bond is created between the bonding surface and the web portion.

In an embodiment, the housing of the connection device to be connected by a material-to-material bond to the connecting element has a step at the transition between a first housing side extending parallel to the main body of the connecting element and a second housing side extending transverse to the first housing side, the step forming a bonding surface that is set back from the second housing side. Thus, the connecting element can be placed against the housing of the connection device in such a way that the connecting portion of the connecting element engages with the step and thereby comes into areal contact with the bonding surface at the step. The material-to-material bond can be created between the connecting portion and the bonding surface in the region of the step so as to connect the connecting element to the connection device.

Advantageously, the housing of each connection device has at least one such step for connection to an associated connecting element.

Furthermore, the housing advantageously has at least one step at each of the housing sides that are spaced apart in the row direction and form respective side faces of the housing, so that the connection device can be connected at opposite housing sides to one respective connecting element.

In an embodiment, the connecting portion of the connecting element rests in the step in such a way that the outwardly facing exterior surface of the connecting portion is flush with the second housing side. Because the bonding surface formed at the step is set back from the second housing side and because the connecting portion of the connecting element engages with the step, it is possible to produce an assembly that is flat and flush at the second side of the connection device, in particular without the connecting portion of the connecting element projecting outwardly relative to the second housing side.

In an embodiment, a plurality of pairs of connection devices which are offset from each other along a vertical direction perpendicular to the row direction can be connected together via one connecting element. Thus, the connecting element may advantageously be configured to connect together a first pair of connection devices arranged adjacent to each other along the row direction and a second pair of connection devices arranged adjacent to each other along the row direction which second pair of connection devices is offset from the first pair of connection devices along the vertical direction, which is perpendicular to the row direction. Thus, such connecting elements can be used to connect together two (or more) rows of connection devices, which makes it possible to produce a variably configurable assembly for providing a multiplicity of termination points for connection of electrical conductors. For this purpose, the connecting element is to be connected by a material-to-material bond to at least one of the connection devices of the first pair and to at least one of the connection devices of the second pair. Preferably, the connecting element forms a material-to-material bond with both connection devices of both the first pair and the second pair, thus fixedly attaching the connection devices to one another by material-to-material bonds.

In an embodiment the invention also provides a method for producing an assembly for electrical equipment, in which method a plurality of modular connection devices which each have a housing and at least one termination point for connection of an electrical conductor are arranged side-by-side in a row along a row direction. In the method, two of the plurality of connection devices, which two connection devices are adjacent to each other along the row direction, are connected together via a connecting element having a main body and a connecting portion formed on the main body by connecting the connecting element via the connecting portion to the housing of at least one of the two adjacent connection devices by material-to-material bonding.

The advantages and advantageous embodiments described above with respect to the assembly are analogously applicable to the method, and thus, reference is made to the above discussion.

Figure 1:
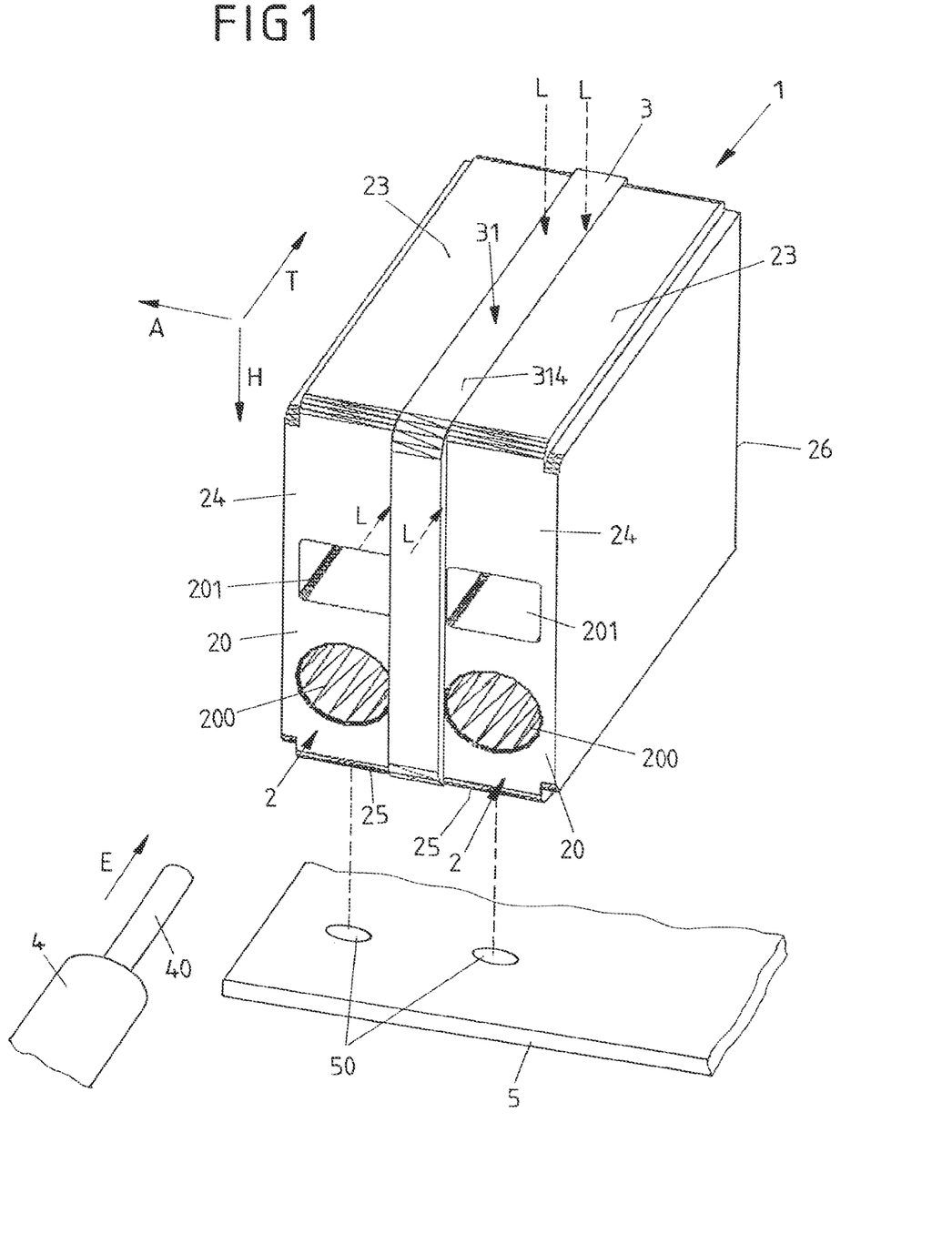
FIG. 1 is a view of an assembly including two connection devices which are connected together via a connecting element.

FIG. 1 shows an exemplary embodiment of an assembly 1 having connection devices 2 in the form of modular connecting terminals capable of being arranged side-by-side in a row along a row direction A.

Each of the connection devices 2 has a housing 20 in which are formed a termination point in the form of an insertion opening 200 as well as an actuating opening 201. An electrical conductor 4 can be inserted with a stripped conductor end 40 in an insertion direction E into insertion opening 200 so as to be electrically contacted within housing 20 to a suitable contacting device in the form of a spring-loaded contact, a screw contact, an insulation-displacement contact, a crimp contact, or another contact for electrically contacting with an electrical contact section, such as, for example, a busbar. An actuating element, such as a push-button, for releasing a spring-loaded contact or a screw element for clamping or releasing electrical conductor 4 can be actuated through actuating opening 201.

By arranging a multiplicity of connection devices 2 side-by-side along row direction A, it is possible to produce an assembly 1 which provides a multiplicity of termination points 200 for connection of a multiplicity of electrical conductors 2. Assembly 1 may be disposed, for example, on a circuit board 5 and electrically connected to circuit board 5 via contact points 50 so that assembly 1 provides an interface module on circuit board 5 for electrical connection of electrical conductors 4 to circuit board 5.

Within assembly 1, two adjacent connection devices 2 are connected together via a connecting element 3.

Figure 3:
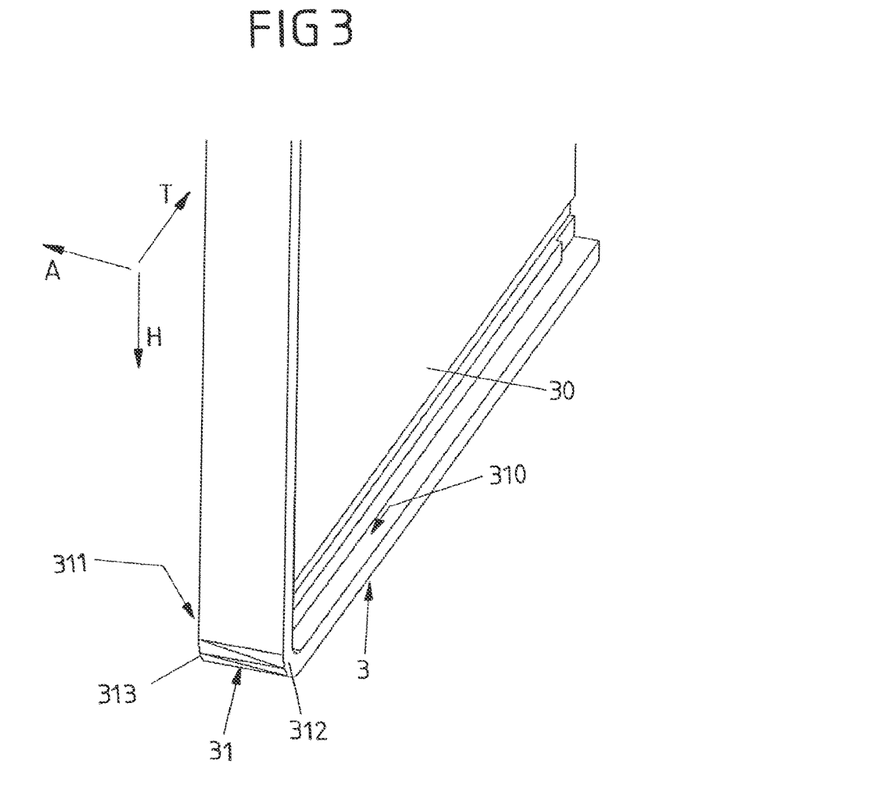
FIG. 3 is a separate view of a portion of the connecting element.

As can be seen from FIG. 3, connecting element 3 has a main body 30 in the form of a planar portion that extends along a plane oriented perpendicular to row direction A and assumes an intermediate position between the two adjacent connection devices 2 when the connection devices 2 are connected together.

Main body 30 is bounded on three sides by a connecting portion 31 which is formed along the edge of main body 30 and whose two web portions 312, 313 project on both sides from main body 30 along row direction A. At the transition between main body 30 and connecting portion 31, there are thus formed steps 310, 311 on both sides of main body 30, the steps serving to cooperate with housings 20 of adjacent connection devices 2 to create a material-to-material bond.

As can be seen from FIG. 1, when connection devices 2 are connected together, connecting portion 31 of connecting element 3 extends circumferentially around housings 20 of connection devices 2 on three sides. In this condition, web portions 312, 313 of connecting element 3 overlap housings 20 of connection devices 2 along row direction A so that connecting portion 31 is in contact with bonding surfaces 211, 221, 240, 241 (shown in FIG. 2) which are formed on housings 20 of connection devices 2.

Housings 20 of connection devices 2 are preferably made of an electrically insulating plastic material. Each housing 20 electrically insulatingly encloses a respective electrical contacting device disposed therein. At the transition between lateral housing sides 21, 22 and an upper housing side 23, as well as at the transition between lateral housing sides 21, 22 and a lower housing side 25 (see FIG. 1), there are formed respective steps 210, 220, each allowing engagement of a connecting portion 31 of a respective connecting element 3 to be placed against one of housing sides 21, 22 to thereby create a connection between housing 20 of connection device and connecting element 3, as can be seen in FIG. 1.

Once connecting element 3 is placed against an associated connection device 2, exterior surface 314 of connecting portion 31 is flush with upper housing side 23 and lower housing side 25 of the respective associated connection device 2 so that connecting portion 31 of connecting element 3 does not project above housing 20 of the respective associated connection device 2 along a vertical direction H perpendicular to row direction A.

While upper housing side 23 and lower housing side 25 are each formed with steps 210, 220, front housing side 24 does not have any steps or bonding surfaces 240, 241 that would be stepped back from front housing side 24. Here, connecting portion 31 of a respective associated connecting element 3 rests against the front surface of housing side 24 and projects above housing side 24 along a depth direction T perpendicular to row direction A and perpendicular to vertical direction H, as can be seen in FIG. 1.

Connecting element 3 may be connected by a material-to-material bond to both of the adjacent connection devices 2. Such a material-to-material bond can be created in different ways.

In one embodiment, connection devices 2 may be connected together via connecting element 3 by adhesively bonding connecting element 3 to housings 20 of connection devices 2. To this end, connecting element 3 is wetted with a suitable adhesive, for example in the region of its web portions 312, 313, and thus adhesively bonded to housings 20 of connection devices 2.

In another embodiment, connecting element 3 is connected to housings 20 of connection devices 2 by laser welding, in particular laser transmission welding. To this end, a laser welding beam L may be directed from outside onto web portions 312, 313 perpendicularly to row direction A along a respective normal to the surface of connecting portion 31, as illustrated in FIG. 1, so that connecting portion 31 is weldingly connected at web portions 312, 313 to housings 20 of connection devices 2.

To enable laser transmission welding, connecting element 3 is made from a material that is transparent to laser welding beam L, at least in the region of web portions 312, 313 of connecting portion 31, so that laser welding beam L can pass through web portions 312, 313 and hit the respective associated housing 20 in the region of the respective bonding surface 211, 221, 240, 241. In the region of the respective bonding surfaces 211, 221, 240, 241, housing 20 is made from a material that absorbs laser light, so that housing 20 absorbs energy of laser welding beam L and is partially melted in the region of bonding surfaces 211, 221, 240, 241. Thus, housing 20 forms a material-to-material bond in particular with connecting portion 31, so that connecting element 3 is connected by a material-to-material bond to the adjacent housings 20.

Because connecting portion 31 extends around housings 20 of connection devices 2 on three sides, connection devices 2 are firmly and strongly connected together via connecting element 3. Housings 20 of adjacent connection devices 2 do not necessarily have to be identical in contour in order to create the material-to-material bond, but rather the connection devices 2 may differ in design.

After connection devices 2 have been connected together via connecting elements 3 to produce assembly 1, assembly 1 can be placed with lower housing sides 25 of connection devices 2, for example, on a circuit board 5, so as to mechanically and electrically attach assembly 1 to circuit board 5.

Figure 2:
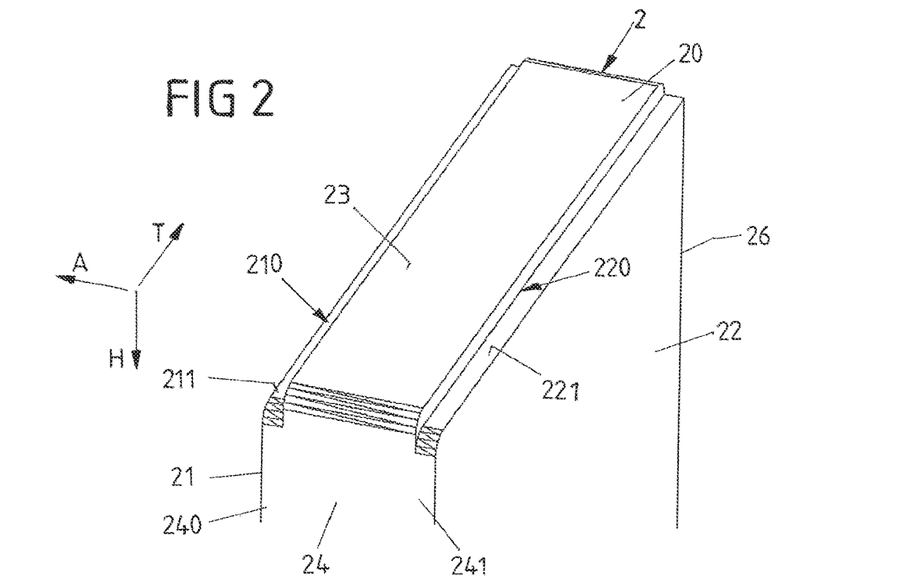
FIG. 2 is a separate view of a portion of one of the connection devices.

In the exemplary embodiment of FIGS. 1 through 3, connection devices 2 may be arranged side-by-side in a row along row direction A and adjacent connection devices 2 may be connected together via respective connecting elements 3 interposed therebetween so as to produce a single-row arrangement of connection devices 2. In contrast, in an exemplary embodiment as shown in FIGS. 4 and 5, it is possible to produce a plurality of rows of connection devices 2 which are connected to one another via connecting elements 3, so that a multi-row assembly 1 of connection devices 2 is provided.

Figure 4:
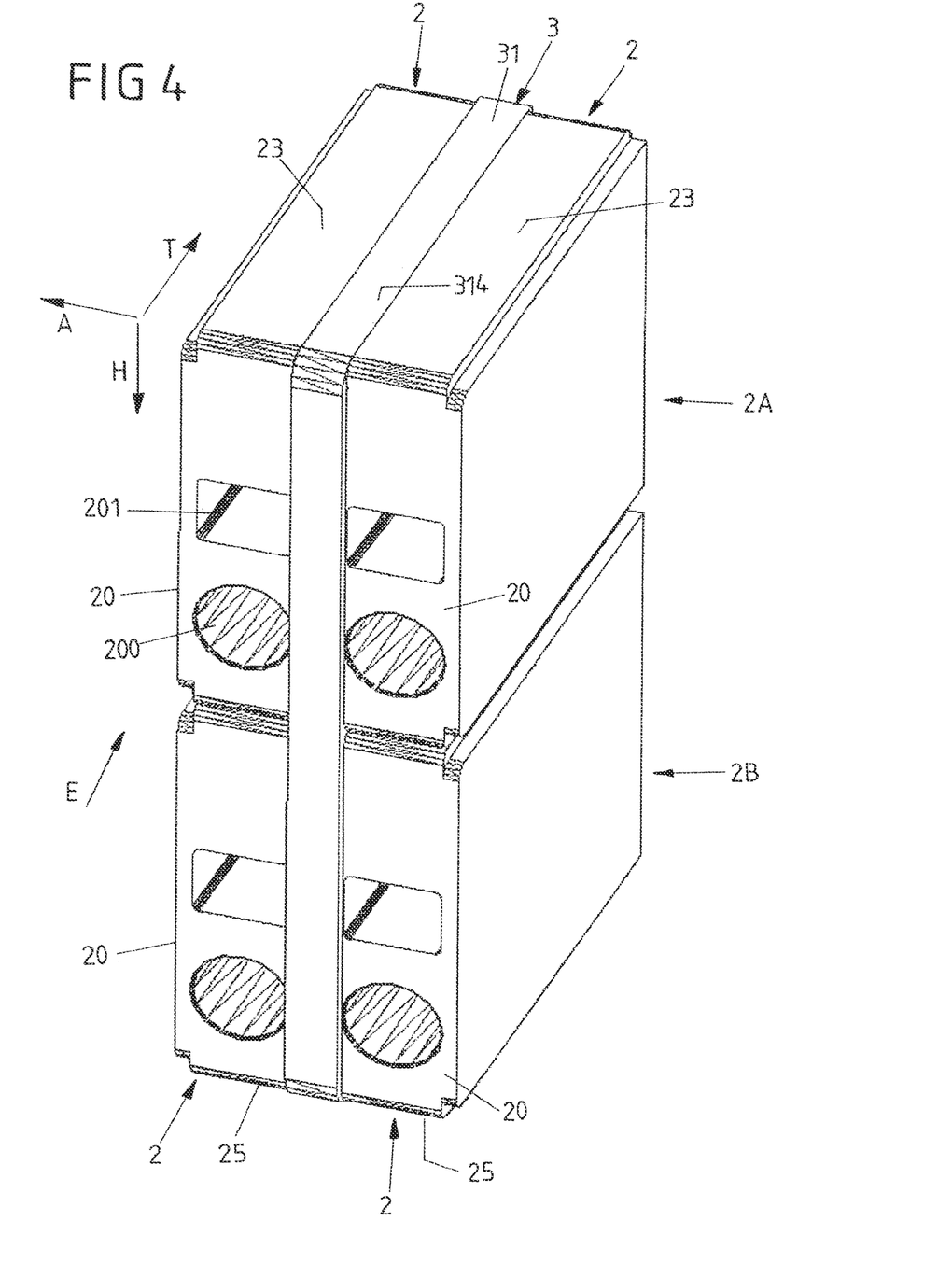
FIG. 4 is a view of an assembly including two pairs of connection devices which are connected together via a common connecting element.
Figure 5:
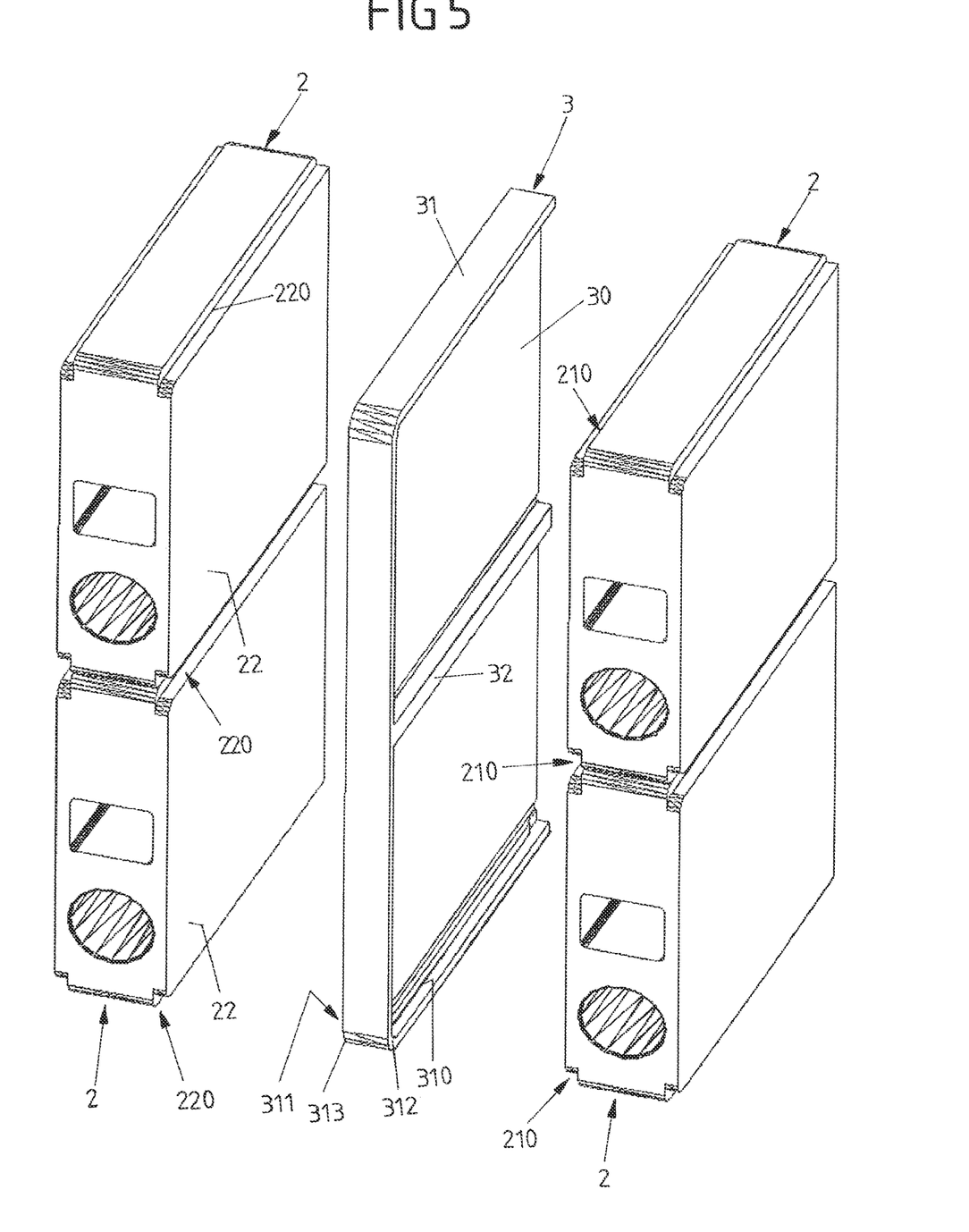
FIG. 5 is an exploded view of the assembly shown in FIG. 4.

In the exemplary embodiment illustrated in FIGS. 4 and 5, two pairs 2A, 2B of connection devices 2 are connected together via one connecting element 3. Here, pairs 2A, 2B of connection devices 2 are offset from each other along vertical direction H, which is oriented perpendicular to row direction A, so that connection devices 2 of a first pair 2A are disposed above connection devices 2 of a second pair 2B. Connecting element 3 extends over the combined height of the pairs 2A, 2B of connection devices 2 placed on one another in vertical direction H and connects the two pairs 2A, 2B of connection devices 2 together.

Housings 20 of connection devices 2 are designed as described hereinabove for the exemplary embodiment of FIGS. 1 through 3. However, connecting element 3 extends over twice the height (as compared to the connecting element 3 of FIGS. 1 through 3) and can be connected by a material-to-material bond to each of the connection devices 2 adjacent thereto along row direction A.

Due to the steps on the upper and lower sides of housing 20, the connection devices 2 placed on one another along vertical direction H form a groove where they meet, as can be seen in FIG. 5. As is apparent from FIG. 5, connecting element 3 is formed on both sides with a central engagement rib 32 which extends from main body 30 along depth direction T and which, when connection devices 2 have been placed on one another, serves to engage a groove between connection devices 2 that are adjacent to each other along vertical direction H so that connection devices 2 are supported relative to one another via engagement rib 32.

In particular, if the material-to-material bond is produced by adhesive bonding, adhesive may also be applied in the region of engagement rib 32 so that an adhesive material bond is also created in the region of engagement rib 32.

The connecting elements 3 of both the exemplary embodiment of FIGS. 1 through 3 and the exemplary embodiment of FIGS. 4 and 5 are preferably made from an electrically insulating plastic material so that connecting elements 4 can be used to (additionally) electrically insulate connection devices 2 from one another.

The concept underlying the invention is not limited to the above-described exemplary embodiments, but may also be implemented in a different way.

Connection devices of the type discussed herein may be of completely different design and, in particular, may implement electrical contacts in the form of spring-loaded contacts, screw contacts, insulation-displacement contacts, crimp contacts, or the like.

The connection devices may implement terminal blocks, connectors, and also base strips, and may preferably be placed on a circuit board side-by-side in a row.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 assembly
2 connection device
2A, 2B pairs
20 housing
200 termination point (insertion opening)
201 actuating opening
21, 22 housing side
210, 220 step
211, 221 bonding surface
23 housing side
24 housing side
240, 241 bonding surface
25 housing side
26 housing side
3 connecting element
30 main body
31 connecting portion
310, 311 step
312, 313 web portion
314 exterior surface
32 engagement rib
4 electrical conductor
40 conductor end
5 circuit board
50 contact point
A row direction
E insertion direction
L laser welding beam

The invention claimed is:
1. An assembly for electrical equipment, comprising:
a plurality of connection devices configured to be modularly arranged side-by-side in a row along a row direction, each having a housing and at least one termination point configured to connect at least one electrical conductor; and
a connecting element having a main body and a connecting portion formed on the main body, the connecting element being configured to connect together two of the plurality of connection devices which two connection devices are adjacent to each other along the row direction,
wherein the connecting element is connected via the connecting portion to the housing of at least one of the two adjacent connection devices by material-to-material bonding, and
wherein the housing of the at least one of the two adjacent connection devices has a step at a transition between a first housing side extending parallel to the main body of the connecting element and a second housing side extending transverse to the first housing side, which step forms a bonding surface that is set back from the second housing side, the connecting portion of the connecting element engaging with the step to make areal contact with the bonding surface.

2. The assembly of claim 1, wherein the connecting element is connected via the connecting portion to the at least one of the two adjacent connection devices by adhesive bonding or by welding.

3. The assembly of claim 1, wherein the main body extends along a plane perpendicular to the row direction.

4. The assembly of claim 1, wherein the connecting portion extends around at least a portion of the main body.

5. The assembly of claim 1, wherein, in a position where the connecting element has been placed against the at least one of the two adjacent connection devices, the connecting portion extends around at least a portion of the housing of the at least one of the two adjacent connection devices.

6. The assembly of claim 1, wherein the connecting portion projects from the main body along the row direction, at least on one side.

7. The assembly of claim 1, wherein the connecting portion forms a web portion which projects from the main body along the row direction.

8. The assembly of claim 7, wherein, in a position where the connecting element has been placed against the at least one of the two adjacent connection devices, the web portion overlaps the housing of the at least one of the two adjacent connection devices such that that the web portion faces a bonding surface located on the housing transversely to the row direction.

9. The assembly of claim 8, wherein the web portion comprises a material that is transparent to a laser welding beam, and the housing, at least at the bonding surface, comprises a material that absorbs a laser welding beam.

10. The assembly of claim 1, wherein the connecting portion engages with the step such that an outwardly facing exterior surface of the connecting portion is flush with the second housing side.

11. The assembly of claim 1, wherein the connecting element is configured to connect together a first pair of connection devices arranged adjacent to each other along the row direction and a second pair of connection devices arranged adjacent to each other along the row direction, which second pair of connection devices is offset from the first pair of connection devices along a vertical direction oriented perpendicular to the row direction.

12. The assembly of claim 11, wherein the connecting element is connected by material-to-material bonding via the connecting portion to the housings of at least one connection device of the first pair of connection devices and of at least one connection device of the second pair of connection devices.

13. A method for producing an assembly for electrical equipment, comprising:
arranging side-by-side in a row along a row direction a plurality of modular connection devices which each have a housing and at least one termination point for connection of at least one electrical conductor; and
connecting together two of the plurality of connection devices, which two connection devices are adjacent to each other along the row direction, via a connecting element having a main body and a connecting portion formed on the main body by connecting the connecting element via the connecting portion to the housing of at least one of the two adjacent connection devices by material-to-material bonding, wherein the housing of the at least one of the two adjacent connection devices has a step at a transition between a first housing side extending parallel to the main body of the connecting element and a second housing side extending transverse to the first housing side, which step forms a bonding surface that is set back from the second housing side, the connecting portion of the connecting element engaging with the step to make areal contact with the bonding surface.

\* \* \* \* \*